United States Patent Office  3,207,592
Patented Sept. 21, 1965

3,207,592
GELLED SOLUTIONS OF PLANT GROWTH PROMOTERS
Billy G. Harper, Lake Jackson, Tex., and Valdemar J. Christensen, Pasadena, Calif., assignors to The Dow Chemical Company, Midland, Mich., a corporation of Delaware
No Drawing. Filed Apr. 3, 1963, Ser. No. 270,201
5 Claims. (Cl. 71—1)

This application is a continuation-in-part of application Serial No. 12,964, filed March 7, 1960, now abandoned.

This invention relates to agricultural chemistry and more particularly is concerned with an improved method for applying volatile agricultural chemicals whereby the volatility of said chemicals is substantially reduced during application of such chemicals.

One example of such a volatile chemical is ammonia which, when used as a fertilizer, is generally applied in the anhydrous form through the use of portable mechanisms, such as a ground injector-type applicator. The most successful application of anhydrous ammonia to date has been accomplished by use of special equipment including pressurized tanks and injector devices whereby the fertilizer is immediately covered by soil after application. An attempt has been made to reduce the volatility losses of ammonia during application by premixing the fertilizer with water in the upper portion of an injection tube as taught in U.S. Patent 2,784,530. However, even in this case, the volatilization of the ammonia from the solution must be prevented immediately after application, usually by covering it with soil as in the case of the anhydrous ammonia.

Another agricultural application for ammonia is for the purpose of defoliating plants. For example, cotton plants are defoliated by spraying with ammonia prior to picking the cotton.

Heretofore, spraying of such volatile compounds has proven to be an inefficient method of application because only a part of the volatile compound actually reaches the soil, or in the case of defoliation, the plant. Aerial application has been virtually impossible because a large percentage of the ammonia is dissipated before reaching the desired location. Depending on the volatility of the agricultural chemicals and the method of application, the loss through volatilization can be, and in some instances usually is, very significant. It is to minimize such losses during application that the present invention is directed.

It is a principal object of the present invention to provide an improved method for applying highly volatile agricultural chemicals.

It is another object of this invention to provide an improved method of applying ammonia as a fertilizer.

It is a further object of this invention to provide an improved method of applying ammonia as a defoliant.

It is yet another object of this invention to provide an improved method of spraying ammonia in which the losses of ammonia due to its volatility are substantially reduced.

A still further object of this invention is to provide aqueous dispersions of ammonia which can be sprayed without appreciable losses of ammonia due to volatilization during the spraying thereof.

Other objects and advantages will become apparent hereinafter.

The foregoing and additional objects are accomplished by providing an aqueous dispersion containing an effective quantity of a highly volatile agricultural chemical and containing from about 0.20 to about 5.0 percent by weight of a polymeric thickening agent.

In a particular embodiment of this invention crosslinked monovalent cation salts of polyacrylic acid are utilized as a gelling agent for these dispersions, although crosslinked polyglycols which originally prior to crosslinking have a molecular weight of from about 1000 up to a million or more, crosslinked substantially water-insoluble, water-swellable, sulfonated alkaryl and aromatic polymers, e.g., crosslinked sulfonated polyvinyltoluene and crosslinked copolymers of such sulfonated alkaryl and aromatic materials with acrylonitrile, alkylacrylonitriles and methacrylates and other crosslinked, waterswellable water-insoluble polymers can be employed. In another embodiment of this invention, linear, noncrosslinked water soluble polymers can be used to form the thickened solution. Examples of such polymers are polyacrylic acid, sulfonated polyvinyltoluene, and copolymers of acrylonitrile.

Substantially water-insoluble, water-swellable, crosslinked polyacrylate salts suitable for use in the present invention are those prepared by subjecting a solution of a monovalent cation salt of acrylic acid to the influence of high-energy ionizing radiation for a period of time sufficient to effect the desired polymerization and crosslinking in at least a portion of the polymer produced. Generally speaking, the amount of ionizing radiation should be at least 0.5 megarad but greater or lesser amounts can be employed for certain applications. In any event, the amount of radiation must be great enough to give a swellable polymer having a high enough degree of crosslinking to impart strength and water insolubility thereto. It is critical to the composition of the present invention that the salt-forming cation of such polyacrylate resins be monovalent. Representative examples of monovalent cations include, for example, the alkali metals, i.e., sodium, potassium, lithium, rubidium, and cesium, as well as ammonium and alkyl substituted ammonium radicals based upon the quaternary nitrogen atom.

Also, useful cross-linked polymers can be prepared by chemical means using other polymerizable monomers in minor amounts as cross-linking agents, such as, for example, N,N'-methylenebisacrylamide, diethyleneglycol diacrylate, divinyl benzene, and the like. Cross-linked polymers of acrylamide and N-vinyl substituted cyclic amides such as N-vinyl pyrollidone, N-vinyl morpholinone, and N-vinyl oxazolidinone are useful in the practice of this invention.

The linear polymers useful for making the dispersions of the present invention are prepared in ways known to those skilled in the art. Thus, the linear, water-soluble polyelectrolytes which are shown, together with their method of preparation, in U.S. 2,625,471 are useful in making these dispersions.

While aqueous dispersions containing as low as 0.20 percent of the polymeric thickening agents based on the weight of the dispersion will show some improvement in reducing volatility loss of the aqueous dispersions, it is preferred to use quantities of between about 0.5 and about 5.0 percent of the polymeric thickener based on the weight of the dispersion and desirably from about 1.0 to about 3.0 percent on this weight. Dispersions containing as high as 10 percent of the polymer are rather thick and become somewhat difficult to apply even with modified conventional equipment. Therefore, it is preferred that the maximum quantity of polymeric thickener in the dispersion be about 5.0 percent or less. It will be recognized that the desirable amount of gelling or thickening agent may vary, depending on the efficiency of the particular material employed.

In carrying out the procedure of the present invention, an aqueous solution of ammonia is provided and a cross-linked polymer, e.g., a cross-linked polyacrylate salt, is mixed with such aqueous solution so that a swelled-gel results. Generally, this mixing is accomplished by merely adding the polymer to the aqueous dispersion with agitation, provided that the agitation is not of sufficient magnitude to cause significant shearing of the thickening agent. Advantageously, a gelled solution can be prepared by first pulverizing the polyacrylate salt to a desired particle size that will produce a swelled particle having a minimum diameter of about 2 mm. and then mixing the so-prepared powder into the aqueous solution with stirring.

Alternatively, chunks of the polymer can be added to an aqueous solution of the ammonia. This produces a gel-like mass as the polymer swells. This mass can be broken up by stirring to give with the polyacrylate salts a gel structure of discrete gelled particles the same as are obtained by adding the pulverized polymer to the aqueous solution.

Another variable which provides still a third alternative of gel preparation is the design of the applicator. The size of the nozzle and the pressure on it can be varied so that the particles are sheared to the proper range of sizes during ejection. For linear or lightly cross-linked materials this is an effective way of controlling the particle size as the sprayed particles of these polymers cannot readily be formed prior to spraying.

The resulting swelled-gel is applied either through coarse spraying nozzles or other type ejector tubes or nozzles. It is essential to use larger orifices in the spray nozzle than would be employed with prior art techniques of spraying to obtain the desired size of particles. However, this is within the skill of the art and may be readily determined upon application of the material. Advantageously, the particles are kept above a certain minimum size; e.g., in applying the gels of aqueous ammonia of this invention the particle minimum diameter should be in the range from about 2 to 10 millimeters. The upper droplet diameter size in turn is limited only in respect that good fertilizer or defoliating coverage is attained.

It will be recognized by those skilled in the art that this particle size is considerably above that produced by conventional spray equipment and, that for use with such gelled compositions such equipment can be modified as, for example by reducing the ejection pressure or increasing the diameter of the ejector opening.

Quantities of ammonia to be employed are those quantities which are effective. By this is meant those quantities which would normally be employed with prior art application techniques, since the compositional matter of the present invention usually does not affect the plant sorption of the plant growth affector. Ordinarily, solutions containing at least about 20% of ammonia are used for reasons of economy.

It is known to those skilled in the art that certain water soluble polyelectrolytes used as soil conditioners and/or carrying agents can be combined with soluble fertilizers. Among these fertilizers are dilute aqueous solutions of ammonia. However, it is not taught or suggested in the prior art that concentrated aqueous ammonia solutions can be thickened by adding these same water soluble polyelectrolytes or that crosslinked polyelectrolytes can be added to gel (i.e., imbibe) these concentrated ammonia solutions. Nor is it taught that the volatility of the ammonia from the dispersions thus made will be reduced.

Various compounds, for example calcium cyanamide, magnesium and sodium chlorate and S,S,S-tributylphosphortrithioate, have been used for defoliation. The first mentioned is applied as a granular solid, or dust, and the latter three are sprayed on as solutions. Recently anhydrous ammonia has been used to defoliate cotton. Because of its high volatility and objectionable and hazardous fumes, this latter material has been most difficult to handle. In addition, the losses occurring with conventional application techniques because of the high volatility of ammonia heretofore has made this chemical inefficient and costly for defoliation.

In accordance with the practice of the present invention then, it was found that aqueous solutions of ammonia (20–30% $NH_3$) could be successfully applied as a defoliant when thickened in the same manner as for the above fertilizer application. The following example shows that defoliation is not hindered by the presence of the thickening agent. The use of the combination of aqueous ammonia and a polymeric thickener simplifies the handling of this highly volatile chemical.

The following examples are given to illustrate the present invention but are not to be construed as limiting the invention thereto.

EXAMPLE 1

Gelled, aqueous solutions of ammonia, averaging 24 percent ammonia, were prepared using several different compositions of thickening and gelling agents. The gels were prepared by agitating an aqueuos solution of approximately 24 percent ammonia with a quantity of the gel-promoting additive for a period of time sufficient to substantially uniformly disperse the additive throughout the solution. The resulting thickened solutions were then ejected in a dropwise manner, through a 5.2 millimeter inside diameter discharge tube, vertically into a horizontal stream of air having a velocity of approximately 80 miles per hour. The drops were discharged from the bottom of the tube at a velocity of approximately 0.5 foot per second. The particles, from the point of discharge, were allowed to fall three feet, whence they were collected upon a polyethylene film sheet from which sampls were taken to determine the loss of ammonia. The following Table I tabulates the results obtained:

*Table I*

| Run No. | Gelling agent | | Ammonia retained (Expressed as percent of $NH^3$) (originally present in sample) |
|---|---|---|---|
| | Composition | Percent on wt. of soln. | |
| 1 | (Control) | | 65 |
| 2 | Carbopol* | 0.25 | 75 |
| 3 | ___do.* | 0.50 | 77 |
| 4 | ___do.* | 1.00 | 86 |
| 5 | Potassium polyacrylate. | 1.00 | 95 |

*Carbapol is a trademark for a high molecular weight polycarboxylic acid containing substantially no crosslinking.

The potassium polyacrylate used was a high molecular weight product having a substantial quantity of crosslinking, and was prepared by treating a potassium polyacrylate solution with 2.29 megarads of radiation.

EXAMPLE 2

Using the same procedure and experimental test conditions as were followed in Example 1, drop tests were run evaluating a number of monovalent alkali polyacrylate salts as gelling agents for aqueous ammonia solutions containing about 24 percent ammonia. The results of a series of test runs comparing the effectiveness of the polyacrylate salts over a range from about 0.1 to about 1 percent and at a discharge velocity from the tube up to about 1.0 foot per second are summarized in Table II which follows:

*Table II*

| Run No. | Polyacrylate salt | | Percent of original ammonia retained, discharge rate, ft./sec. | | | | |
|---|---|---|---|---|---|---|---|
| | Cation | Percent* | 0.2 | 0.4 | 0.6 | 0.8 | 1.0 |
| 1 | No additive | | | | About 45 | 56 | 59 | 60 |
| 2 | Potassium | 0.1 | 56 | 69 | 75 | 79 | 81 |
| 3 | do | 1.0 | 81 | 90 | 92 | 92 | 92 |
| 4 | Lithium | 0.2 | 67 | 77 | 82 | 84 | 84 |
| 5 | do | 0.5 | 74 | 83 | 88 | 89.5 | 90.5 |
| 6 | do | 1.0 | | 88 | 90 | 90 | 90 |
| 7 | Ammonium | 0.5 | 72 | 82 | 87 | 88.5 | 89.5 |
| 8 | do | 1.0 | 87.5 | 91 | 91.5 | 92 | 92.5 |

*Based on weight of ammonia solution.

EXAMPLE 3

To 1000 pounds of an aqueous ammonia solution (about 24 percent ammonia content by weight) in a conventional mixing tank is added with stirring about 10 pounds of pulverized crosslinked potassium polyacrylate. Stirring of the mix is continued after the polyacrylate addition is completed until the swelled polyacrylate particle gives the desired gelled dispersion.

The so-prepared gel-like mass is transferred to the reservoir tank of an aerial application apparatus. This gelled fertilizer composition is then applied to a flooded field containing young rice shoots whose tips are still below the surface of the water, using ordinary aerial application equipment modified to eject thick slurries. The plane is flown about 8 feet above the surface of the flooded field, and the fertilizer is sprayed in particles having an average minimum diameter of about 2 millimeters. The application is made at a dosage rate of about 20 gallons of the compositions per acre of the rice field.

Fertilization of the flooded field by tractor drawn conventional injector apparatus, as is presently used for applying volatile plant growth promoters, is impossible.

EXAMPLE 4

A thickened aqueous ammonia dispersion was prepared by adding 272 parts by weight (4.1%) of a crosslinked polymer of potassium acrylate prepared by using 0.05 percent of N,N'-methylene-bisacrylamide as a crosslinker with 0.25 percent sodium persulfate (Na₂S₂O₈) as catalyst and 0.25 percent sodium bisulfite (NaHSO₃) as activator, to an aqueous solution of 5.450 parts by weight of 29% ammonia and 872 parts by weight of water. The resulting dispersion was sprayed by simple nozzle ejection techniques onto a field of cotton to defoliate the plants. An aqueous solution containing the same quantity of NH₃, but without a thickener was also sprayed on another part of the field of cotton for comparison. The percent of defoliation accomplished is shown in the following table along with the amount used per acre.

Percent defoliated:
  Pounds NH₃ per acre _____ 150
  Ungelled conc. NH₄OH _____ 90
  Gelled conc. NH₄OH _____ 86

These results show no detrimental losses of ammonia when applied as the novel compositions of the present invention.

Applying ammonia as a thickened aqueous solution makes it possible to use conventional equipment. The spraying of anhydrous ammonia takes special application equipment and safeguards to protect the operator. By using a gelled aqueous solution of ammonia this is avoided.

In a manner similar to that described for the foregoing examples, sodium, rubidium, cesium, methylammonium, ethylammonium, dimethylammonium and alkyl substituted ammonium radicals based upon the quaternary nitrogen atom can be utilized as monovalent cations in the polyacrylate salt to give water-swellable polymers useful as gelling agents with aqueous dispersions of ammonia.

Also, other substantially water-insoluble, swellable, crosslinked resins, for example, polyglycols crosslinked with toluene diisocyanate, poly(trimethyl ar-vinylbenzyl)ammonium chloride, partially sulfonated polyvinyl toluene in its acid form, other sulfonated alkaryl and aromatic polymers and copolymers of such sulfonated alkaryl and aromatic materials with acrylonitrile, alkylacrylonitriles and methacrylates and other linear polymers as mentioned herein can be used as gelling agents in this application.

Various modifications can be made in the present invention without departing from the spirit and scope thereof, for it is understood that we limit ourselves only as defined in the appended claims.

We claim:

1. A gelled agricultural composition exhibiting low volatilization losses of ammonia comprising an aqueous solution of ammonia, containing a minimum of 20 percent NH₃, together with a polymeric thickening agent selected from the group consisting of linear and crosslinked polymers of acrylic acid, methacrylic acid, alkali salts of acrylic acid, alkali salts of methacrylic acid, alkyl quaternary ammonium salts of acrylic acid, acrylonitrile, sulfonated vinyl toluene, and glycols in an amount of from about 0.2 to 5.0 percent by weight of the composition.

2. A method of defoliating vegetation with low volatility losses of a normally highly volatile defoliating agricultural aqueous ammonia solution which comprises:
  (a) providing a substantially uniform thickened gelled dispersion consisting essentially of an aqueous solution of ammonia in combination with from about 0.2 to about 5.0 percent by weight of the dispersion of a polymeric thickening agent, said polymeric thickening agent being a member selected from the group consisting of linear and crosslinked polymers of acrylic acid, methacrylic acid, alkali salts of acrylic acid, alkali salts of methacrylic acid, alkyl quaternary ammonium salts of acrylic acid, acrylonitrile, sulfonated vinyl toluene and glycols, the concentration of ammonia in said dispersion being sufficient to defoliate vegetation contacted by said dispersion,
  (b) transferring said dispersion to a spray applicator and
  (c) spraying said dispersion on to said vegetation in particles having a minimum diameter of about 2.0 millimeters thereby to provide for low volatility losses of said defoliating ammonia during the spray application.

3. A method of fertilizing soil with low volatility losses of normally highly volatile ammonia which comprises:
  (a) providing a substantially uniform thickened, gelled dispersion consisting essentially of an aqueous solution of said ammonia in combination with from about 0.2 to about 5.0 percent by weight of the dispersion of a polymeric thickening agent, selected from the group consisting of linear and crosslinked polymers of acrylic acid, methacrylic acid, alkali salts of acrylic acid, alkali salts of methacrylic acid, alkyl quaternary ammonium salts of acrylic acid, acrylonitrile, sulfonated vinyl toluene and glycols, the concentration of ammonia in said dispersion being sufficient to fertilize soil contacted by said dispersion, (b) transferring said dispersion to a spray applicator, and (c) spraying said dispersion to to said soil in particles having a minimum diameter of about 2.0 millimeters thereby to provide for low volatility losses of said fertilizing ammonia during the spray application.

4. A method for aplying aqueous ammonia agricultural solutions exhibiting reduced volatility losses of ammonia during application which comprises providing an aqueous gelled solution of ammonia, said aqueous gelled solution of ammonia containing a minimum of 20 percent $NH_3$ and containing from about 0.2 to about 5 percent by weight of said solution of a polymeric thickening agent selected from the group consisting of linear and crosslinked polymers of acrylic acid, methacrylic acid, alkali salts of acrylic acid, alkali salts of methacrylic acid, alkyl quaternary ammonium salts of acrylic acid, acrylonitrile, sulfonated vinyl toluene and glycols and spraying said gelled dispersion of said aqueous ammonia solution onto soil.

5. The process as defined in claim 4 wherein the gelled aqueous ammonia solution contains from about 0.5 to about 5 weight percent of a substantially water-insoluble, water-swellable, crosslinked polyacrylate monovalent cation salt and including the step of spraying said gelled aqueous ammonia solution onto soil as a particulate dispersion wherein the particles have a minimum diameter of about 2.0 millimeters.

References Cited by the Examiner

UNITED STATES PATENTS

| | | | |
|---|---|---|---|
| 2,625,471 | 1/53 | Mowry et al. | 71—1 |
| 2,663,629 | 12/53 | Semon | 71—64 |
| 2,702,965 | 3/55 | Boyd | 71—1 |
| 2,847,392 | 8/58 | Eck | 71—1 |
| 2,951,753 | 9/60 | Groves | 71—1 |
| 2,971,292 | 2/61 | Malecki | 71—1 |

FOREIGN PATENTS 730,463   5/55   Great Britain.

DONALL H. SYLVESTER, *Primary Examiner.*
ANTHONY SCIAMANNA, *Examiner.*